(12) United States Patent
Cicero et al.

(10) Patent No.: US 9,548,476 B2
(45) Date of Patent: Jan. 17, 2017

(54) MULTI-CELL BATTERY MODULE WITH INTEGRAL COOLING AND ASSEMBLY AIDS

(75) Inventors: Marke S. Cicero, Ortonville, MI (US); Andreas Ruehle, Stuttgart (DE)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 1280 days.

(21) Appl. No.: 13/329,858

(22) Filed: Dec. 19, 2011

(65) Prior Publication Data

US 2012/0156543 A1   Jun. 21, 2012

Related U.S. Application Data

(60) Provisional application No. 61/424,825, filed on Dec. 20, 2010.

(51) Int. Cl.
*H01M 2/02* (2006.01)
*H01M 2/30* (2006.01)
(Continued)

(52) U.S. Cl.
CPC ........... *H01M 2/024* (2013.01); *H01M 2/0242* (2013.01); *H01M 2/0247* (2013.01);
(Continued)

(58) Field of Classification Search
CPC ............................. H01M 2/024; H01M 2/0242
(Continued)

(56) References Cited

U.S. PATENT DOCUMENTS 6,190,795 B1 * 2/2001 Daley ........................... 429/100

6,403,178 B1   6/2002 Ono et al. .................... 428/35.7
(Continued)

FOREIGN PATENT DOCUMENTS

CN   1992385 A   7/2007
CN   101933176 A   12/2010
(Continued)

OTHER PUBLICATIONS

Machine Translation of FR2762932 to Verhoog et al. published Nov. 1998.*
(Continued)

*Primary Examiner* — Jonathan G Leong
(74) *Attorney, Agent, or Firm* — Maginot Moore & Beck LLP (57) ABSTRACT

A battery pack includes a frame member, first and second lithium ion cells, and an isolation plate. The frame member includes a floor, walls formed perpendicular to the floor, and an aperture defined by the walls. The frame member is formed from an electrically non-conductive plastic. The first lithium ion cell includes a first positive terminal, a first negative terminal, and a first electrically conductive housing. The first positive terminal is electrically connected to the first electrically conductive housing. The second lithium ion cell includes a second positive terminal, a second negative terminal, and a second electrically conductive housing. The second positive terminal is electrically connected to the second electrically conductive housing. The isolation plate directly contacts both the first and second electrically conductive housings and electrically isolates the first electrically conductive housing from the second electrically conductive housing. The isolation plate is formed from the electrically non-conductive plastic.

12 Claims, 8 Drawing Sheets

(51) Int. Cl.
*H01M 10/04* (2006.01)
*H01M 10/0525* (2010.01)
*H01M 10/6556* (2014.01)
*H01M 10/613* (2014.01)
*H01M 10/647* (2014.01)

(52) U.S. Cl.
CPC ......... *H01M 2/0262* (2013.01); *H01M 2/305* (2013.01); *H01M 10/0481* (2013.01); *H01M 10/0525* (2013.01); *H01M 10/613* (2015.04); *H01M 10/6556* (2015.04); *H01M 10/647* (2015.04); *Y02E 60/122* (2013.01); *Y02T 10/7011* (2013.01)

(58) Field of Classification Search
USPC ................................ 429/120, 176, 162, 163
See application file for complete search history.

(56) References Cited

U.S. PATENT DOCUMENTS

| | | | |
|---|---|---|---|
| 6,858,344 B2* | 2/2005 | Marukawa et al. | 429/148 |
| 2003/0180582 A1* | 9/2003 | Masumoto et al. | 429/7 |
| 2004/0142238 A1* | 7/2004 | Asahina et al. | 429/176 |
| 2006/0093890 A1 | 5/2006 | Steinbroner et al. | 429/37 |
| 2006/0093899 A1* | 5/2006 | Jeon | H01M 2/1072 429/99 |
| 2007/0052390 A1 | 3/2007 | Kim et al. | 320/116 |
| 2009/0155675 A1* | 6/2009 | Houchin-Miller | 429/120 |
| 2009/0214943 A1 | 8/2009 | Masson et al. | 429/129 |
| 2010/0167115 A1 | 7/2010 | Okada et al. | |
| 2010/0196749 A1 | 8/2010 | Yoshida et al. | 429/99 |
| 2011/0064992 A1 | 3/2011 | Kim et al. | 429/153 |
| 2012/0125447 A1* | 5/2012 | Fuhr | H01M 2/0262 137/260 |

FOREIGN PATENT DOCUMENTS

| | | |
|---|---|---|
| EP | 0881696 A1 | 12/1998 |
| EP | 1760806 A2 | 3/2007 |
| EP | 2093820 A1 | 8/2009 |
| EP | 2249414 A1 | 11/2010 |
| FR | 2762932 A1 | 11/1998 |
| FR | 2928035 A1 | 8/2009 |
| JP | 11031483 A | 2/1999 |
| JP | 11-273752 A | 10/1999 |
| JP | 2001072814 A | 3/2001 |
| JP | 2001155702 A | 6/2001 |
| JP | 2007073509 A | 3/2007 |
| JP | 2009211835 A | 9/2009 |
| JP | 4656585 B2 | 3/2011 |
| KR | 20070025737 A | 3/2007 |
| KR | 20100057876 A | 6/2010 |
| WO | WO 2006050258 A2 | 5/2006 |
| WO | WO2009107557 A1 | 9/2009 |
| WO | 2010059957 A2 | 5/2010 |
| WO | WO 2010135456 A2 * | 11/2010 .......... H01M 2/0262 |

OTHER PUBLICATIONS

Notification of Transmittal of the International Search Report and the Written Opinion of the International Searching Authority, or the Declaration, for International Application No. PCT/US2011/066051, mailed Apr. 3, 2012.

Written Opinion of the International Searching Authority, International Application No. PCT/US2011/066051 mailed Apr. 3, 2012.

English Translation of Japanese Search Report and Written Opinion corresponding to Japanese Application P2013-546313, mailed Nov. 4, 2015 (6 pages).

European Search Report and Written Opinion corresponding to European Application No. 11 809 024.0, mailed Feb. 3, 2016 (5 pages).

* cited by examiner

MULTI-CELL BATTERY MODULE WITH INTEGRAL COOLING AND ASSEMBLY AIDS

CROSS-REFERENCE TO RELATED APPLICATIONS

This application claims the benefit of U.S. Provisional Application No. 61/424,825, filed on Dec. 20, 2010. The disclosure of the above application is incorporated herein by reference in its entirety.

FIELD

The present disclosure relates to battery packs for vehicles and more particularly to battery pack systems for prismatic cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid electric vehicles (HEVs) and plug-in HEVs use multiple propulsion systems to provide motive power. The propulsion systems may include electric or battery powered systems that receive power from one or more battery packs. A battery pack may include, for example, one or more banks of high-voltage cells (or batteries), such as lithium ion cells. The cells are volumetric building blocks of the battery pack.

The operating temperature of a cell can affect the lifespan and performance (charging and discharging efficiencies) of the cell. Regulating the operating temperature of a cell within a predetermined operating temperature range may maximize lifespan and performance of the cell.

Within a battery pack, however, the operating temperatures of the cells may vary from cell to cell. Temperature variations can arise between the cells of a battery pack for various reasons. For example only, temperature variations can arise due to manufacturing differences between the cells, differences in locations of the cells within the battery pack, thermal path differences of each cell, and other reasons. It can be difficult to maintain each of the cells of a battery pack within the predetermined operating temperature range.

SUMMARY

A battery pack includes a frame member, first and second lithium ion cells, and an isolation plate. The frame member includes a floor, walls formed perpendicular to the floor, and an aperture defined by the walls. The frame member is formed from an electrically non-conductive plastic. The first lithium ion cell includes a first positive terminal, a first negative terminal, and a first electrically conductive housing. The first lithium ion cell is disposed between the walls of the frame member. The first positive terminal is electrically connected to the first electrically conductive housing. The second lithium ion cell includes a second positive terminal, a second negative terminal, and a second electrically conductive housing. The second lithium ion cell is disposed between the walls of the frame member. The second positive terminal is electrically connected to the second electrically conductive housing. The isolation plate directly contacts both the first and second electrically conductive housings and electrically isolates the first electrically conductive housing from the second electrically conductive housing. The isolation plate is formed from the electrically non-conductive plastic.

In further features, the battery pack further includes a cooling system that is integrally formed in the frame member. The cooling system includes coolant inlet and outlet ports that are formed in the frame member and includes a coolant channel that is formed through the frame member and that connects the coolant inlet and outlet ports.

In still further features, the battery pack further includes N other lithium ion cells that each include a positive terminal and a negative terminal, that each include an electrically conductive housing, and that are each disposed between the walls of the frame member. The positive terminal of each of the N other lithium ion cells is electrically connected to that cell's electrically conductive housing. N is an integer greater than zero. The battery pack further includes M other isolation plates that electrically isolate each of the electrically conductive housings and the first and second electrically conductive housings from each other. M is an integer that is greater than zero and less than or equal to N.

In other features, the battery pack further comprises a snap fitting element formed on an exterior surface of one of the walls of the frame member; an end plate that interfaces the snap fitting element and that is held in abutment with the exterior surface when the end plate interfaces the snap fitting element; a belt that encircles the frame member and the end plate; and a compressing/restraining element that moves the belt to apply a compressive force on the first and second lithium ion cells.

A frame member of a battery pack includes an upper frame member and a lower frame member. The upper frame member includes a floor for a plurality of cells, includes walls formed perpendicular to the floor, includes an aperture defined by the walls, includes coolant inlet and outlet ports formed in the upper frame member, and includes a first portion of a coolant channel connecting the coolant inlet port to the coolant outlet port. The upper frame member is formed from an electrically non-conductive plastic. The lower frame member includes a second portion of the coolant channel and is joined to the upper frame member to seal the coolant channel. The lower frame member is also formed from the electrically non-conductive plastic.

In other features, the lower frame member is welded to the upper frame member.

In still other features, the frame member further includes an adhesive that joins the lower frame member to the upper frame member.

In further features, the electrically non-conductive plastic is polypropylene (PPE).

In still further features, the upper frame member is formed using injection molding; and the lower frame member is formed using injection molding.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

In the following description, a modular frame for a battery pack is disclosed. The modular frame is shown and described as an example, and one or more characteristics of the modular frame may be modified based on a particular application. For example, the modular frame may be scaled up or down to accommodate a different number of cells. Additionally or alternatively, the modular frame may be modified to accommodate cells having a different size and/or shape. Additionally or alternatively, the modular frame may be modified to accommodate a different arrangement of cells within the modular frame. The modular frame may be formed of an (electrically) non-conductive material, such as polypropylene (PPE). The modular frame aids in isolating the cells from each other, from other system components, and from foreign materials or objects.

An external cooling system includes one or more coolant channels through which a coolant can flow. One or more other external cooling systems may be provided with a battery pack. For example, based on a desired level of cooling, an external cooling system can be inserted between adjacent cells or adjacent rows of cells and/or an external cooling system can be inserted between adjacent battery packs. The cooling system may be made of an electrically conductive material, such as aluminum, to facilitate heat transfer away from the battery pack.

A modular frame of a battery pack of the present disclosure includes an integrated cooling system. The modular frame includes an upper frame member and a lower frame. The upper frame member includes a first portion of a coolant channel, and the lower frame member includes a second portion of the cooling channel. The upper and lower frame members are joined together, such as by welding or an adhesive, to form and seal the coolant channel.

The upper frame member is formed from an electrically non-conductive material, such as PPE. The lower frame member of the modular frame according to the present disclosure is formed from the same electrically non-conductive material as the upper frame member. Relative to aluminum lower frame members, the lower frame member being formed from the same electrically non-conductive material as the upper frame member may be lighter and less costly. Additionally, joining the lower frame member with the upper frame member may be difficult if the lower frame member is made of aluminum.

One or more cells are disposed within the modular frame during assembly of the battery pack. Each cell has a positive terminal, a negative terminal, and an electrically conductive housing. The positive terminal of each cell is electrically connected to that cell's housing. Each of the cells could be wrapped with an electrically non-conductive material to electrically isolate the cells.

According to the present disclosure, isolation plates are inserted between each of the cells during battery pack assembly. An isolation plate inserted between two adjacent cells directly contacts both of the cells and electrically isolates the cells from one another. The isolation plate may be formed from the same electrically non-conductive material as the upper and lower frame members. Relative to battery pack assembly using cells that are individually wrapped with an electrically non-conductive material, battery pack assembly involving insertion of an isolation plate between each cell may be less time consuming and less complicated.

Figure 1:
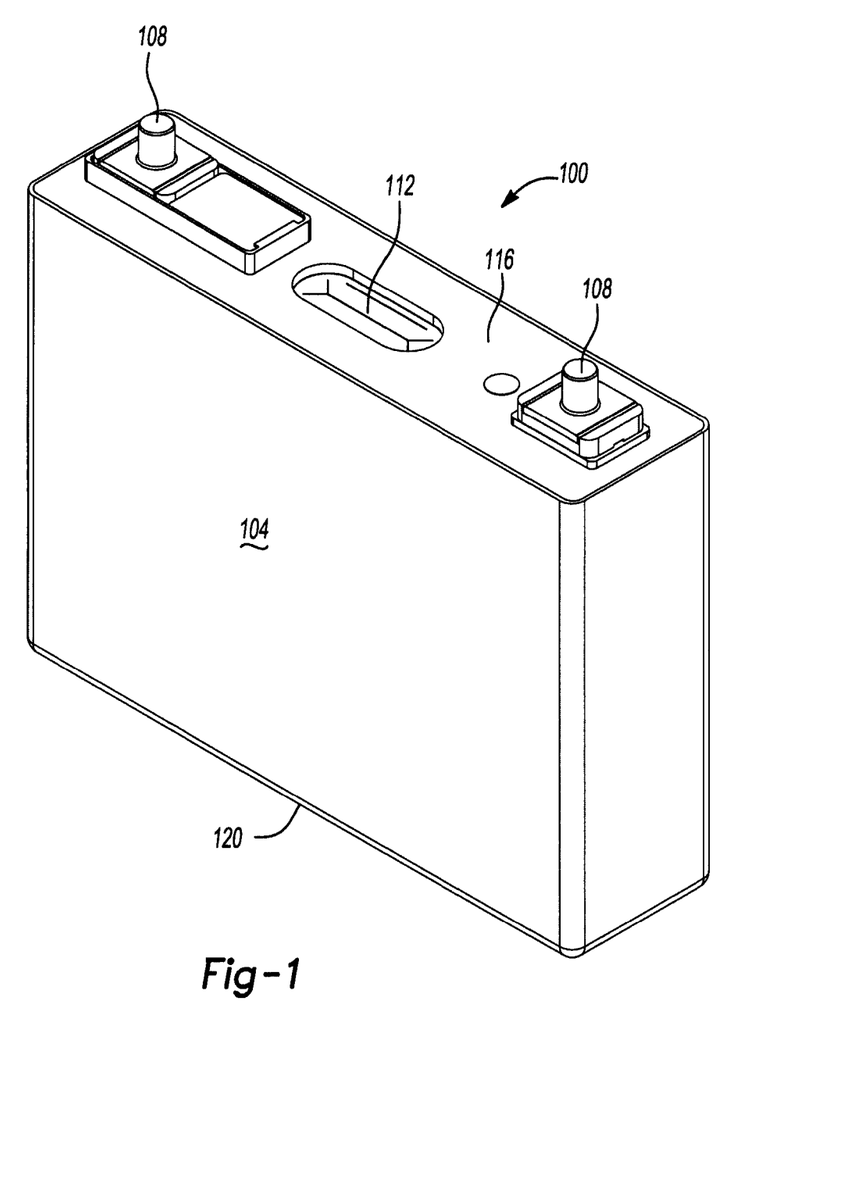
FIG. 1 is a perspective view of a prismatic cell according to the present disclosure.

In FIG. 1, a perspective view of a prismatic cell (hereafter "cell") 100 is shown. The cell 100 may include, for example, a rectangular shaped, lithium-ion cell with a housing (or can) 104. As an example, the can may be formed of aluminum or another (electrically) conductive material.

The cell 100 further includes a pair of terminals 108 that extend from the cell 100. The terminals 108 may include, for example, cylindrical terminals, threaded terminals, flat terminals, or another suitable type of terminal. The cell 100 may be charged and electrical energy may be drawn from the cell 100 via the terminals 108. A positive one of the terminals 108 may be connected to the housing 104. The cell 100 and one or more other cells can be connected in series, in parallel, or combinations thereof as discussed further below.

A release vent 112 may be located on a top surface 116 of the cell 100. The cell 100 also includes a bottom surface 120. The release vent 112 opens and releases gas from within the cell 100, for example, when the cell 100 is overcharged. The release vent 112 may include: a membrane that ruptures; a valve that opens; a plug that separates from the cell; and/or one or more other suitable venting elements.

Figures 2, 3:
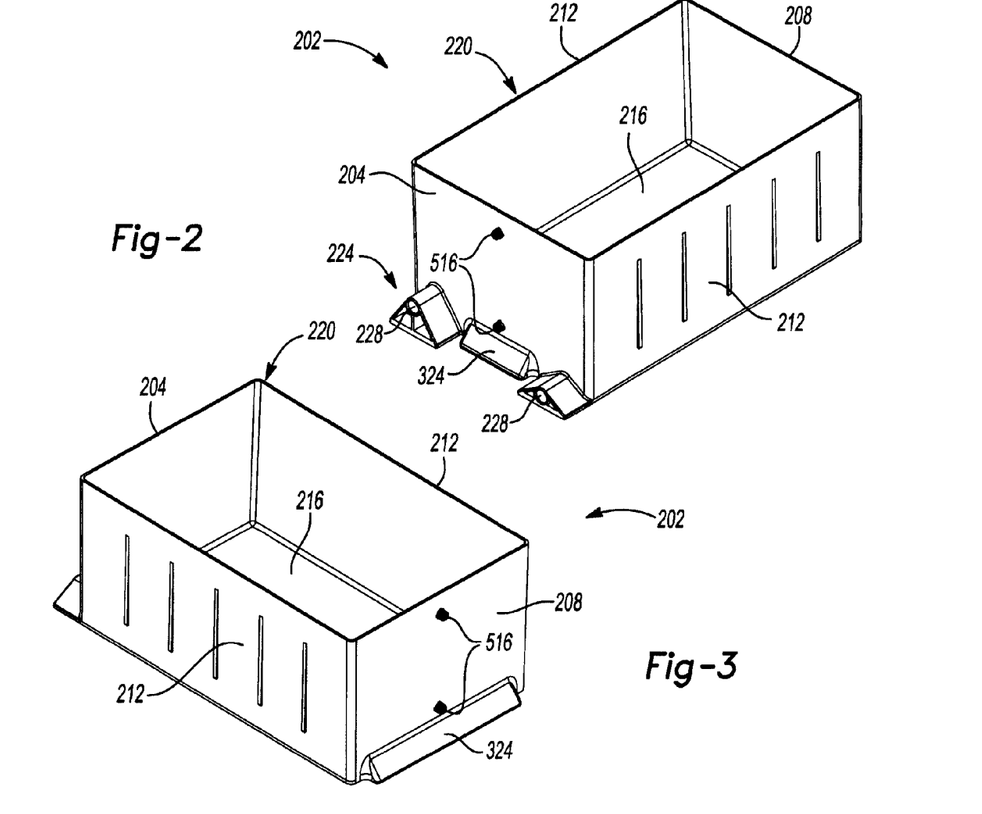
FIGS. 2-4 are perspective view of an upper frame member of a modular frame according to the present disclosure.

In FIGS. 2-6, perspective views of various portions of an example modular frame 200 of a battery pack are shown. The modular frame 200 includes an upper frame member 202 (e.g., see FIGS. 2-4 and 6) and a lower frame member 300 (e.g., see FIGS. 5-6). Referring now to FIGS. 2-3, the upper frame member 202 may be formed of a plastic material, such as PPE, or another suitable type of (electrically) non-conductive material. The upper frame member 202, including the features of the upper frame member 202 described herein, may be formed from the plastic material via injection molding or another suitable type of tooling.

The upper frame member 202 includes a first end wall 204 and a second end wall 208 that extend perpendicular to a floor 216. The upper frame member 202 also includes side walls 212 that extend perpendicular to the floor 216 and perpendicular to the first and second end walls 204 and 208.

The upper frame member 202 is adapted to house multiple cells, such as the cell 100 and one or more other cells. The size and shape of the upper frame member 202 accommodates the assembly of the multiple cells and isolation plates (e.g., see FIG. 7, below) into the modular frame 200. In the examples of FIGS. 2-3, the modular frame 200 can house six cells like the cell 100. The bottom portions of the cells rest upon the floor 216, and the terminals of each of the cells extend toward an aperture 220 in the upper frame member 202. The terminals of the cells may extend above the walls 204, 208, and 212.

The modular frame 200 includes an integral cooling system 224. The cooling system 224 includes ports 228 formed in the modular frame 200. A coolant flows into the modular frame 200 via one of the ports 228. The coolant flows out of the modular frame 200 via the other one of the ports 228. In various implementations, more than the two ports 228 may be implemented. The coolant may include a gas coolant (e.g., air), a liquid coolant, a phase-change coolant, or another suitable type of coolant. The coolant may be input to the modular frame 200, for example, by a coolant pump (not shown) or the cooling system of the modular frame of another battery pack.

Figure 4:
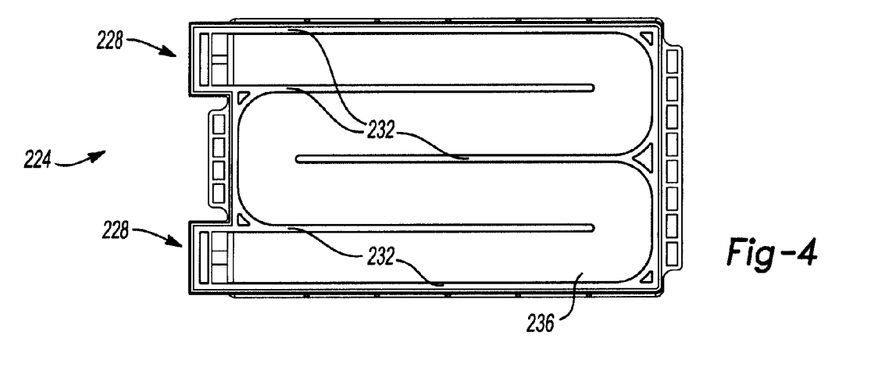

In FIG. 4, a perspective view from below the upper frame member 202 is presented. The upper frame member 202 includes one or more raised portions 232 and a recessed portion 236. The recessed portion 236 is recessed relative to a plane formed by the raised portions 232. The recessed portion 236 forms a portion of a channel through which the coolant can flow from the one of the ports 228 to the other one of the ports 228. The remainder of the channel is formed by the lower frame member 300 as discussed further below. As the coolant flows through the channel, the coolant absorbs heat.

Figures 5, 6:
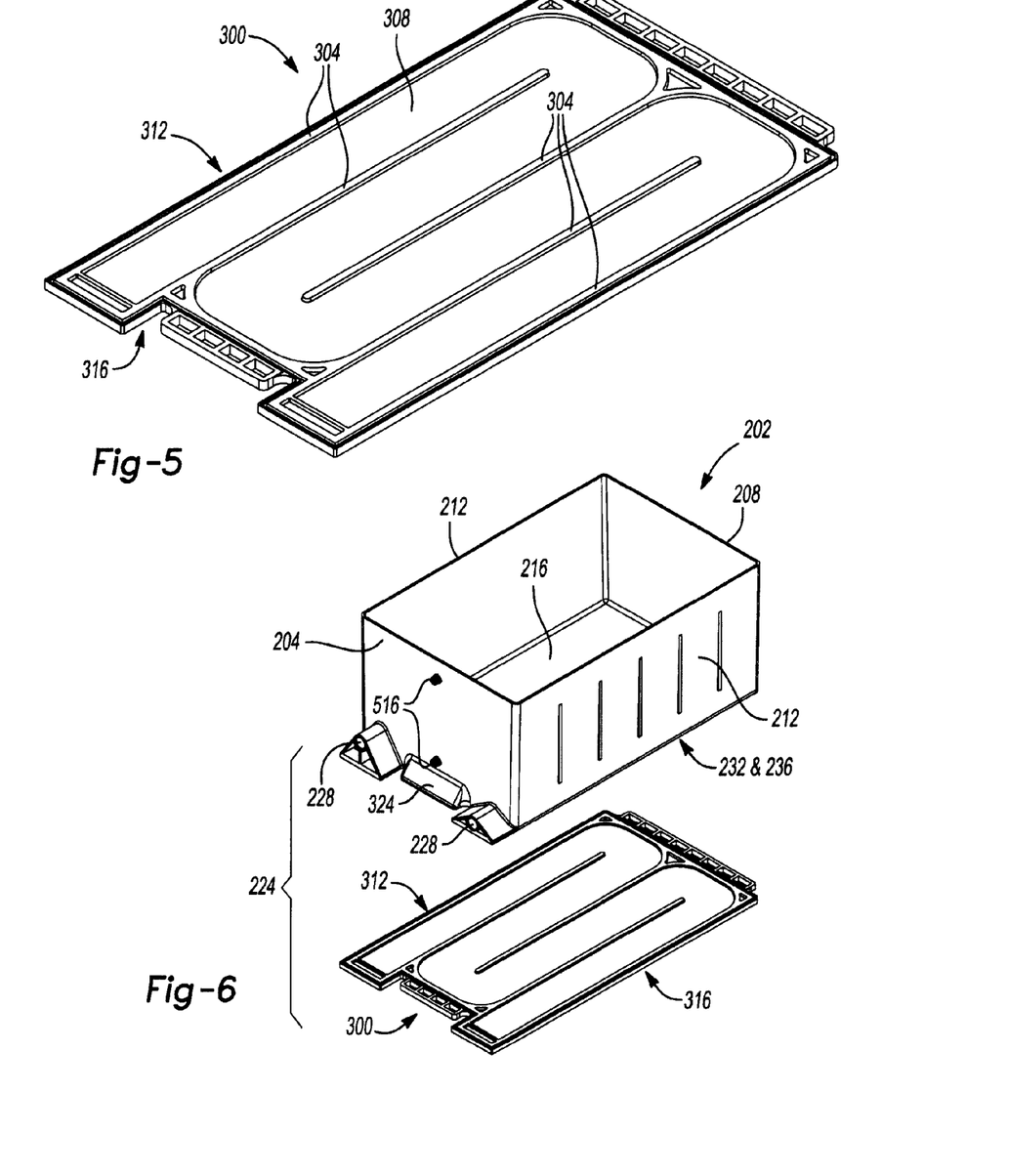
FIG. 5 is a perspective view of a lower frame member of the modular frame according to the present disclosure.
FIG. 6 is a perspective view including the lower frame member positioned below the upper frame member for attachment to the upper frame member according to the present disclosure.

In FIG. 5, a perspective view of an example of the lower frame member 300 is presented. FIG. 6 includes a perspective view of the lower frame member 300 positioned below the upper frame member 202 before the lower frame member 300 is joined with the upper frame member 202.

Referring now to FIGS. 5-6, the lower frame member 300 may be formed from the same material as the upper frame member 202. The lower frame member 300 being formed of the same material as the upper frame member 202 allows the lower frame member 300 to be joined with the upper frame member 202 to form the channel of the cooling system 224. Additionally, the lower frame member 300 being formed of the same material as the upper frame member 202 as opposed to, for example aluminum, may provide weight, cost, and one or more other benefits.

The lower frame member 300 can be joined with the upper frame member 202, for example, using welding (e.g., vibration, ultrasonic, hotplate, laser, etc.), using one or more adhesives (e.g., an epoxy), or using another suitable plastic joining technique. The lower frame member 300, including the features of the lower frame member 300 described herein, may be formed, for example, via injection molding or another suitable type of tooling.

The lower frame member 300 may include one or more raised portions 304 and a recessed portion 308. The recessed portion 308 is recessed relative to a plane formed by the raised portions 304. The raised portions 304 of the lower frame member 300 are identical to the raised portions 232 of the upper frame member 202. The recessed portion 308 of the lower frame member 300 may be identical to the recessed portion 236 of the upper frame member 202. The lower frame member 300 may be joined to the upper frame member 202 by joining the raised portions 232 and the raised portions 304 to seal the channel.

The height of the raised portions 232 may be equal to the height of the raised portions 304, or the heights may be different. In various implementations (not shown), the lower frame member 300 may be a plate formed to have a uniform thickness that does not include the raised portions 304 or the recessed portion 308. The presence of the raised portions 304, however, may provide structural benefits (e.g., rigidity) and/or one or more other benefits.

The lower frame member 300 includes a top side 312 where the raised portions 304 and the recessed portion 308 are formed. The lower frame member 300 also includes a bottom side 316. While not shown, one or more raised portions and one or more recessed portions are also formed on the bottom side 316 of the lower frame member 300 such that the top and bottom sides 312 and 316 of the lower frame member 300 are identical.

Figure 7:
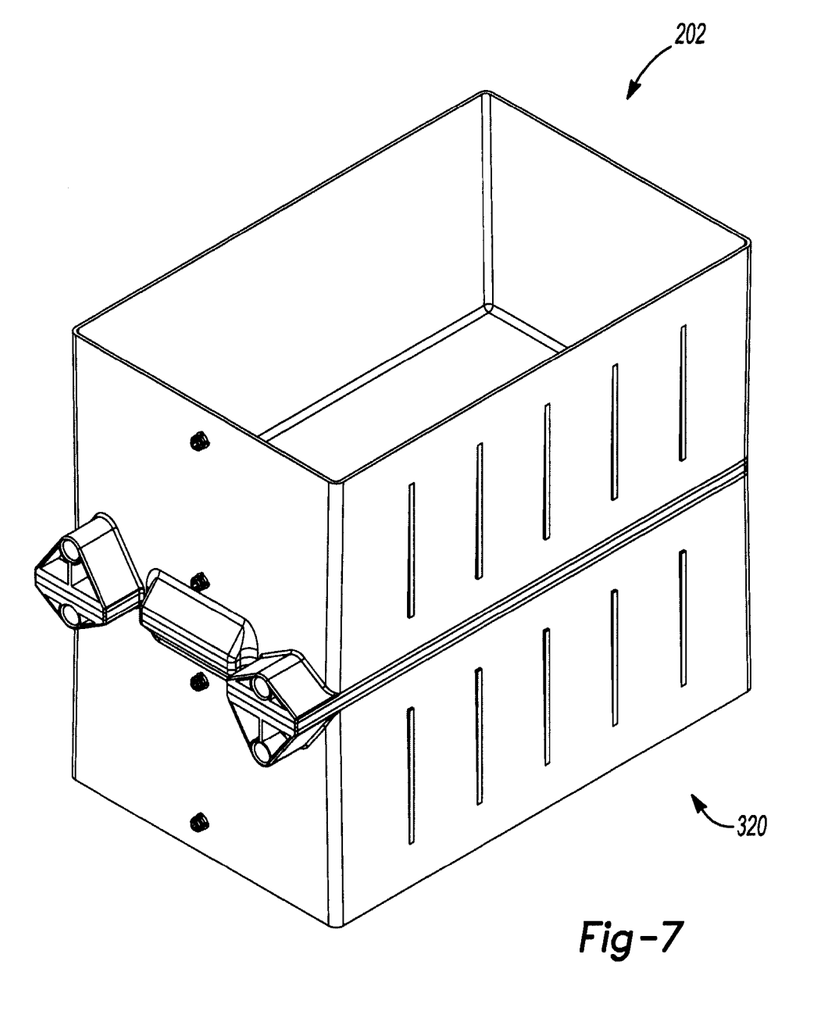
FIG. 7 is a perspective view of the upper frame member and a second upper frame member attached to the lower frame member according to the present disclosure.

Formation of raised and recessed portions on both the top and bottom sides 312 and 316 of the lower frame member 300 may ease assembly as either side of the lower frame member 300 could be joined to the upper frame member 202 during assembly. Additionally, formation of raised and recessed portions on both the top and bottom sides 312 and 316 may enable the lower frame member 300 to be integrated with both the upper frame member 202 and a second upper frame member 320. FIG. 7 is an example perspective view of the upper frame member 202 and the second upper frame member 320 joined to the top and bottom sides 312 and 316 of the lower frame member 300.

Referring again to FIGS. 2 and 3, the upper frame member 202 may also include one or more anchoring members, such as anchoring members 324. The battery pack and other components coupled to the battery pack can be anchored to a frame (e.g., chassis) of a vehicle at the anchoring members 324 via one or more anchoring devices, such as clamps, tie-downs, etc.

Figure 8:
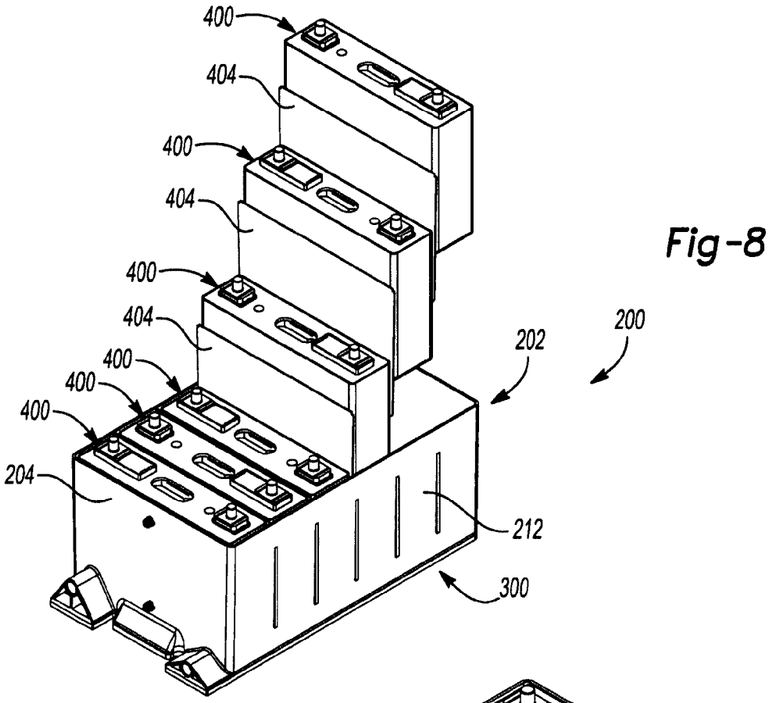
FIG. 8 is a perspective view of the modular frame and a plurality of cells according to the present disclosure.

In FIG. 8, a perspective view of a battery pack including the modular frame 200 and a plurality of cells 400 at various degrees of insertion into the modular frame 200 is presented. The cells 400 are inserted into the modular frame 200 through the aperture 220. The bottom portions of the cells 400 rest upon the floor 216. An isolation plate, such as one of the isolation plates 404, is inserted between each pair of adjacent cells 400. The isolation plates 404 electrically isolate/insulate the cells 400 from each other. The isolation plates 404 may be formed of the same material as the upper frame member 202 and the lower frame member 300 or another suitable (electrically) non-conductive material. The isolation plates 404 may be plates formed to have a uniform thickness.

Figure 9:
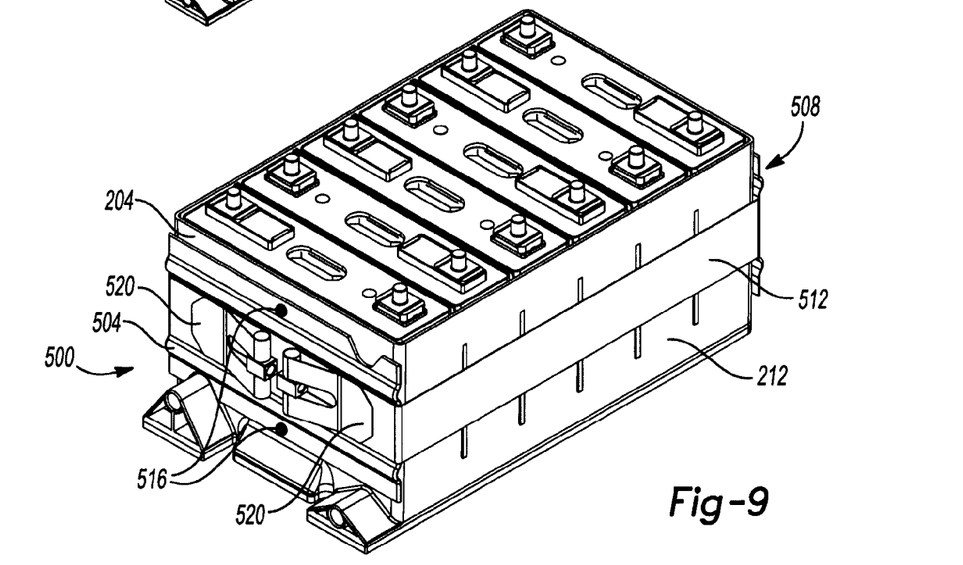
FIG. 9 is a perspective view of the modular frame, the cells, and a cell compression and restraint system according to the present disclosure.

In FIG. 9, a perspective view of the battery pack including the modular frame 200, the cells 400, and a cell compression/restraint system 500 is presented. While the isolation plates 404 are not shown in the example of FIG. 9, the isolation plates 404 electrically isolate the cells 400 from each other.

The cell compression/restraint system 500 includes a first end plate 504, a second end plate 508, and a belt 512. The first and second end plates 504 and 508 and the belt 512 may be made of steel. The upper frame member 202 may include one or more assembly aiding elements 516 formed on each of the first and second end walls 204 and 208. As illustrated in FIGS. 2 and 3, the first and second end walls 204 and 208 may each include one or more assembly aiding elements 516. In various implementations, the first and second end walls 204 and 208 may each include two or more assembly aiding elements. Relative to implementations including one assembly aiding element, the presence of two or more assembly aiding elements on a given end wall may more accurately position the belt 512 and/or the end plate that is held to that end wall during assembly.

For example only, the assembly aiding elements 516 may include one or more (male) snap fitting elements. The snap fitting elements may be, for example, cantilever type snap fitting elements, button type snap fitting elements, or another suitable type of snap fitting elements. The assembly aiding elements 516 formed on a given end wall hold an end plate in abutment with the given end wall. For example, snap fitting elements formed on the first end wall 204 extend through apertures (not individually numbered) through the first end plate 504 to hold the first end plate 504 in abutment with an exterior surface of the first end wall 204. Snap fitting elements formed on the second end wall 208 extend through apertures (not individually numbered) through the second end plate 508 to hold the second end plate 508 in abutment with an exterior surface of the second end wall 208.

Figure 15:
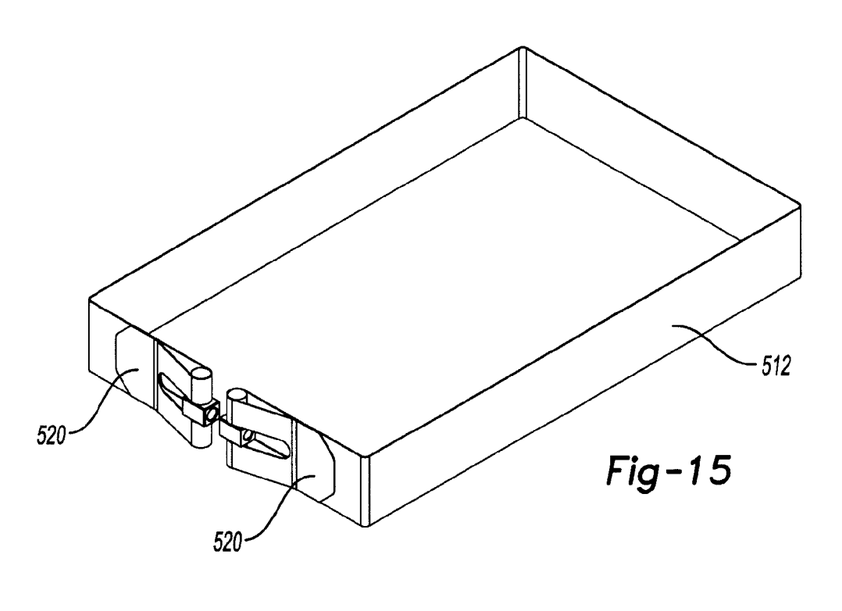
FIG. 15 is a perspective view of the belt according to the present disclosure.

The belt 512 may include a buckle 520 or another suitable compressing element that can tighten the belt 512 while the belt 512 encircles the upper frame member 202 and the first and second end plates 504 and 508. The buckle 520 may include a threaded bolt (not shown) that is rotated to tighten the belt 512. An example perspective view of the belt 512 is provided in FIG. 15.

Once the cells 400 and the isolation plates 404 have been inserted through the aperture 220, the end plates 504 and 508 are being held to the first and second end walls 204 and 208, and the belt 512 has been appropriately positioned, the buckle 520 can be actuated to apply compressive force on the cells 400. The force applied by the belt 512 also restrains the cells 400 from moving in the direction of the aperture 220.

Figure 10:
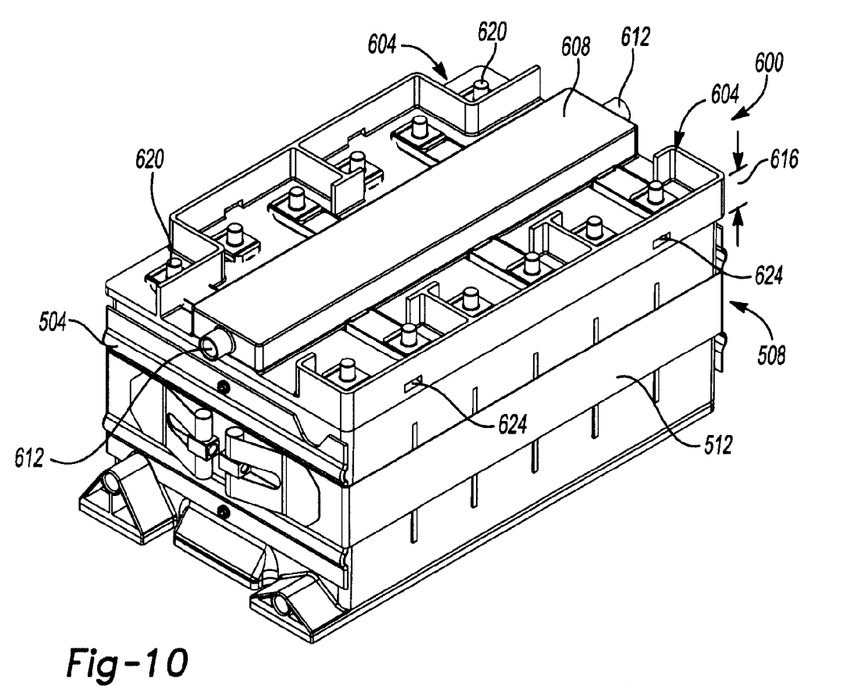
FIG. 10 is a perspective view of the modular frame, terminals of the cells, the cell compression and restraint system, and a frame cover according to the present disclosure.
Figure 11:
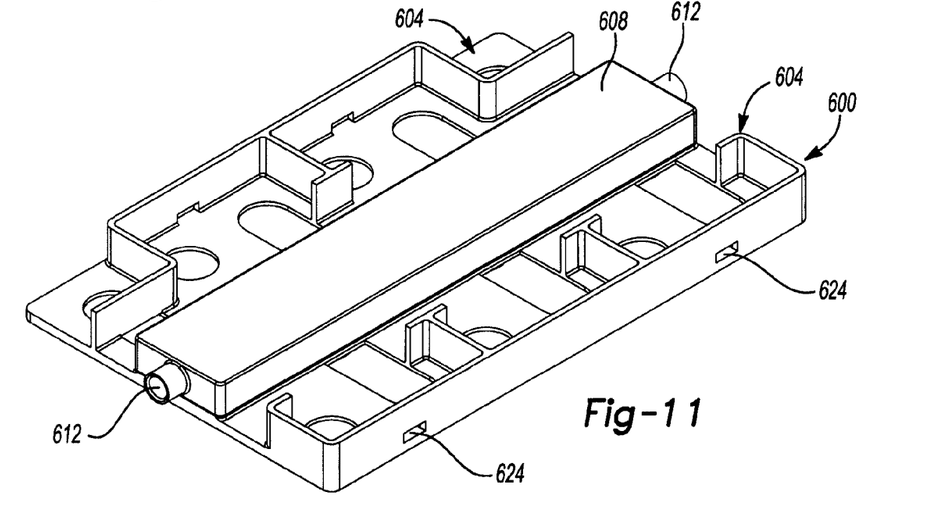
FIG. 11 is a perspective view of the frame cover according the present disclosure.

In FIG. 10, a perspective view of the battery pack including the modular frame 200 and a frame cover 600 is presented. FIG. 11 includes a perspective view of the frame cover 600. Referring now to FIGS. 10-11, the frame cover 600 includes a divider member 604 and a vent manifold 608. The divider member 604 and the vent manifold 608 may be formed from the same material as the upper frame member 202, the lower frame member 300, and the isolation plates 404.

The divider member 604 and the vent manifold 608 may be formed individually, for example, via injection molding or another suitable type of tooling. Once formed, the vent manifold 608 and the divider member 604 may be joined to form the frame cover 600, for example, using welding (e.g., vibration, ultrasonic, hotplate, laser, etc.), using one or more adhesives (e.g., an epoxy), or using another suitable plastic joining technique.

The vent manifold 608 is positioned over the release vents of the cells 400. Gasses released from the cells 400, via the release vents, flows to the vent manifold 608. The vent manifold 608 includes ports 612. Gas released from the cells 400 can be output from the vent manifold 608 via one of the ports 612, and other gases can be input to the vent manifold 608 via the other one of the ports 612.

The divider member 604 includes apertures 618 through which the terminals of the cells 400 extend. The divider member 604 also includes wall members that extend perpendicular to a plane formed by the top surfaces of the cells. The wall members have a height numbered as 616. The wall members may be formed to divide or segment the terminals of the cells 400 into groups of one or more terminals for exterior connection and connecting the cells 400 according to a predetermined configuration. For example only, in the example of FIG. 6, the wall members separate terminals 620 from the other terminals for external connection, and the wall members divide the other terminals such that the other terminals can be connected in an electrical series. The wall members may provide one or more functions, such as preventing tools from contacting two adjacent terminals.

The frame cover 600 may include two or more apertures 624 formed in the frame cover 600. The apertures 624 may receive snap fitting elements formed in a top cover for holding the top cover in abutment with the frame cover 600. The apertures 624 are discussed further below in conjunction with the examples of FIGS. 13 and 14.

Figure 12:
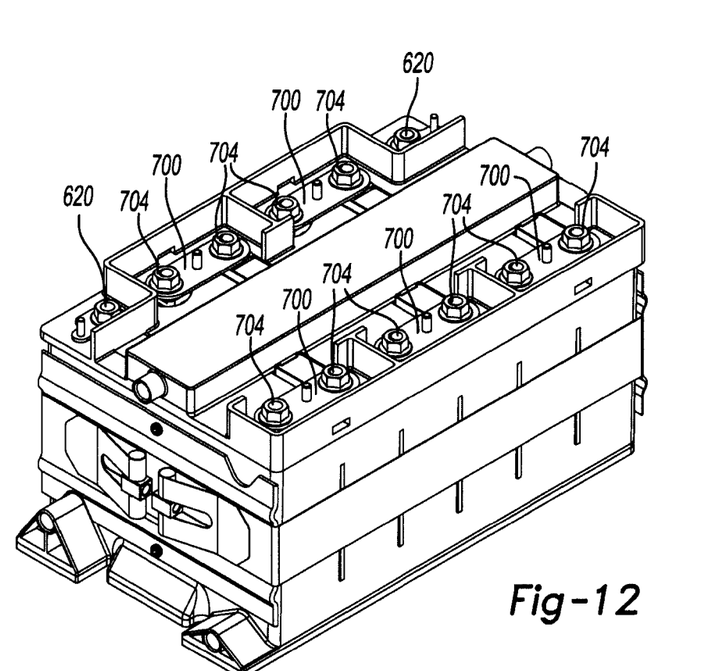
FIG. 12 is a perspective view of the modular frame, the cell compression and restraint system, the frame cover, and terminal connectors according to the present disclosure.

In FIG. 12, a perspective view of the battery pack including the modular frame 200 and terminal connectors 700 is presented. Once the frame cover 600 is positioned upon the upper frame member 202 such that the terminals extend through the apertures formed in the frame cover 600, the terminal connectors 700 can be added for electrically coupling the terminals of the cells 400. The terminal connectors 700 are made of an electrically conductive material. The terminal connectors 700 can be secured to the terminals using, for example, nuts 704, clips (not shown), snap fitting elements, or in another suitable manner. The terminal connectors 700 and the nuts 704 may hold the frame cover 600 in abutment with the cells 400 and/or the top surfaces of the walls of the upper frame member 202.

Figure 13:
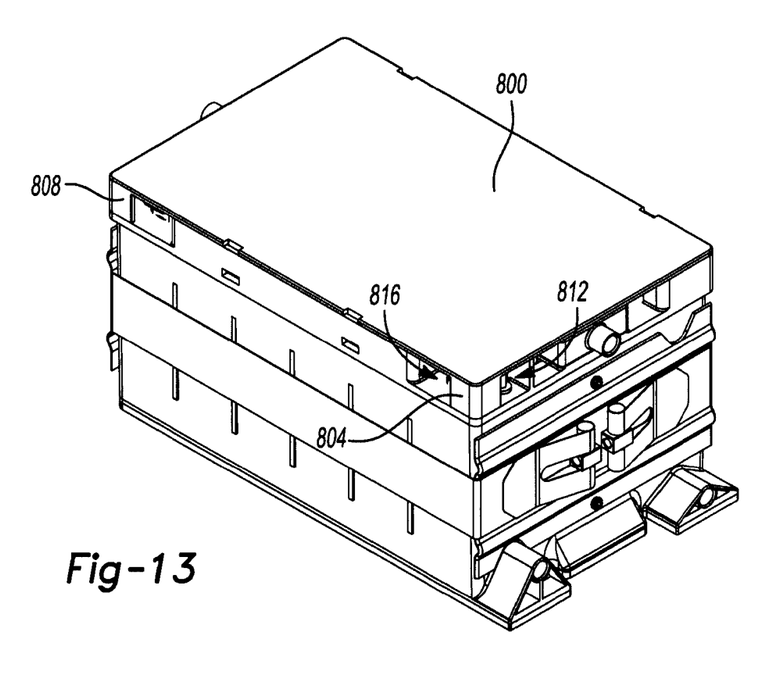
FIG. 13 is a perspective view of the modular frame, the cell compression and restraint system, the frame cover, and a terminal cover according to the present disclosure.
Figure 14:
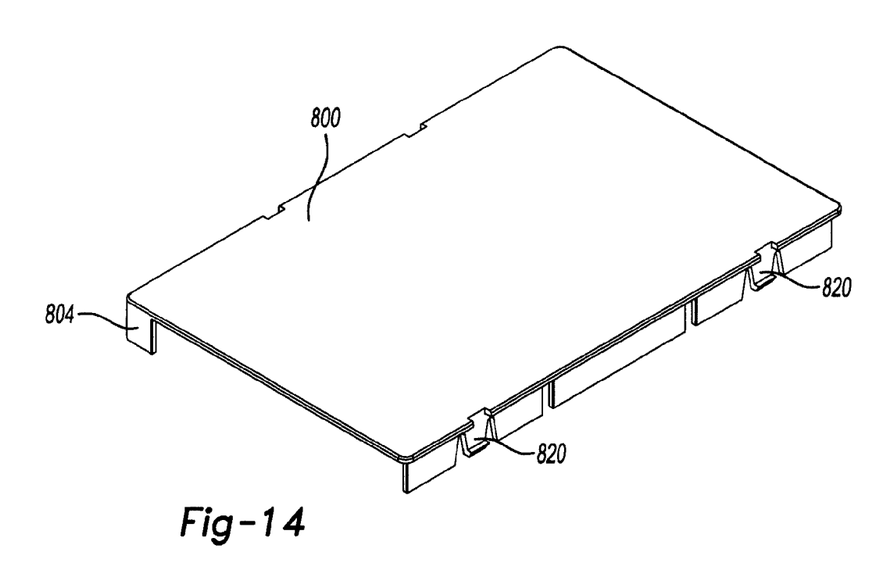
FIG. 14 is a perspective view of the terminal cover according to the present disclosure.

In FIG. 13, a perspective view of the battery pack including the modular frame 200 and a terminal cover 800 is presented. FIG. 14 is a perspective view of the terminal cover 800. Referring now to FIGS. 13 and 14, the terminal cover 800 may be formed of the same material as the upper frame member 202, the lower frame member 300, the isolation plates 404, and the frame cover 600. The terminal cover 800 may be formed, for example, via injection molding or another suitable type of tooling.

The terminal cover 800 covers terminals of the cells 400 and the terminal connectors 700. In this manner, the terminal cover 800 protects the terminals from being contacted from above. The terminal cover 800, however, may allow access to the terminals 620 from one or more side directions. The terminal cover 800 may include one or more support members, such as support members 804 and 808, that provide vertical support to the terminal cover 800 near each of the terminals 620. The support members may be positioned and shaped to create one or more apertures for each of the terminals 620 through which the terminals 620 can be accessed for electrical connection. For example only, the support member 804 is positioned and shaped to create apertures 812 and 816 through which one of the terminals 620 can be accessed. The support member 808 may similarly create apertures through which the other one of the terminals 620 can be accessed.

The terminal cover 800 may include two or more (male) snap fitting elements 820 formed in the terminal cover 800. The snap fitting elements 820 interface the apertures 624 formed in the frame cover 600 to hold the terminal cover 800 in abutment with the frame cover 600. In this manner, the terminal cover 800 can be detached if desired, for example, for service. While cantilever type snap fitting elements are shown, the snap fitting elements 820 and the frame cover 600 can be adapted to implement another suitable type of snap fitting elements. The terminal cover 800 also provides a flat surface on which another battery pack could be stacked, one or more components could be mounted, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A battery pack comprising:
a frame member that includes a floor, that includes walls formed perpendicular to the floor, and that includes an aperture defined by the walls,
wherein the frame member is formed from an electrically non-conductive plastic;
a first lithium ion cell that includes a first positive terminal and a first negative terminal, that includes a first electrically conductive housing, and that is disposed between the walls of the frame member,
wherein the first positive terminal is electrically connected to the first electrically conductive housing;
a second lithium ion cell that includes a second positive terminal and a second negative terminal, that includes a second electrically conductive housing, and that is disposed between the walls of the frame member,
wherein the second positive terminal is electrically connected to the second electrically conductive housing; and
an isolation plate moveable relative to the frame member in a first condition along at least two orthogonal axes within the frame member, the isolation plate directly contacting both the first and second electrically conductive housings and electrically isolating the first electrically conductive housing from the second electrically conductive housing,
wherein the isolation plate is formed from the electrically non-conductive plastic.

2. The battery pack of claim 1 further comprising a cooling system that is integrally formed in the frame member, the cooling system including:
coolant inlet and outlet ports that are formed in the frame member; and
a coolant channel that is formed through the frame member and that connects the coolant inlet and outlet ports.

3. The battery pack of claim 2 wherein the frame member includes:
an upper frame member that includes the floor and the walls, the floor defining at least a portion of a first portion of the coolant channel opposite the aperture; and
a lower frame member that includes a second portion of the coolant channel and that is joined to the upper frame member to seal the coolant channel.

4. The battery pack of claim 3 wherein the lower frame member is welded to the upper frame member.

5. The battery pack of claim 3 further comprising an adhesive that joins the lower frame member to the upper frame member.

6. The battery pack of claim 1 wherein the electrically non-conductive plastic is polypropylene.

7. The battery pack of claim 1 further comprising:
N other lithium ion cells that each include a positive terminal and a negative terminal, that each include an electrically conductive housing, and that are each disposed between the walls of the frame member,
wherein the positive terminal of each of the N other lithium ion cells is electrically connected to its electrically conductive housing, and
wherein N is an integer greater than zero; and
M other isolation plates that are each moveable relative to the frame in a first condition along at least two orthogonal axes within the frame member and that electrically isolate each of the electrically conductive housings and the first and second electrically conductive housings from each other,
wherein M is an integer that is greater than zero and less than or equal to N.

8. The battery pack of claim 7 further comprising:
a snap fitting element formed on an exterior surface of one of the walls of the frame member;
an end plate that interfaces the snap fitting element and that is held in abutment with the exterior surface when the end plate interfaces the snap fitting element;
a belt that encircles the frame member and the end plate; and
a compressing/restraining element that moves the belt to apply a compressive force on the frame member in a second condition such that the isolation plates are pressed into adjacent lithium ion cells.

9. The battery pack of claim 8 further comprising P other snap fitting elements formed on the exterior surface of the one of the walls of the frame member,
wherein P is an integer greater than zero, and
wherein the end plate further interfaces the P other snap fitting elements.

10. The battery pack of claim 8 wherein the snap fitting element is a cantilever type snap fitting element, and
wherein the end plate includes an aperture where the cantilever type snap fitting element interfaces the end plate.

11. The battery pack of claim 3 wherein:
the upper frame member is formed using injection molding; and
the lower frame member is formed using injection molding.

12. The battery pack of claim 3 further comprising:
a second upper frame member that includes a floor for a second plurality of cells, that includes walls formed perpendicular to the floor, that includes a second aperture defined by the walls, that includes a second coolant inlet port formed in the second upper frame member, that includes a second coolant outlet port formed in the second upper frame member, and that includes a first portion of a second coolant channel connecting the second coolant inlet port to the second coolant outlet port,
wherein the lower frame member further includes a second portion of the second coolant channel and is further joined to the second upper frame member to seal the second coolant channel.

* * * * *